United States Patent [19]
Erickson et al.

[11] Patent Number: 6,137,851
[45] Date of Patent: Oct. 24, 2000

[54] SYSTEM AND METHOD FOR SYNCHRONIZING A SIGNAL WITH RESPECT TO ANOTHER SIGNAL

[75] Inventors: Bruce A. Erickson; Rodney H. Orgill, both of Colo. Springs, Colo.

[73] Assignee: Agilent Technologies, Palo Alto, Calif.

[21] Appl. No.: 09/023,840

[22] Filed: Feb. 13, 1998

[51] Int. Cl.[7] ............................. H04L 7/00; H04L 25/40
[52] U.S. Cl. .......................... 375/372; 327/141; 327/144
[58] Field of Search .................................. 375/372, 354; 370/503, 516; 327/153, 161, 141, 144, 145; 365/189.05, 189.12, 194, 193

[56] References Cited

U.S. PATENT DOCUMENTS

| | | | |
|---|---|---|---|
| 4,596,026 | 6/1986 | Cease et al. | 375/372 |
| 4,777,624 | 10/1988 | Ishizawa et al. | 365/189.12 |
| 5,486,784 | 1/1996 | Erikson | 375/372 |
| 5,638,411 | 6/1997 | Oikawa | 375/372 |

*Primary Examiner*—Stephen Chin
*Assistant Examiner*—Betsy L. Deppe

[57] ABSTRACT

A synchronization system synchronizes a first signal with a second signal. Data values of the first signal are stored in a first-in, first-out (FIFO) device in response to strobe signals that latch the first signal. The output of the FIFO device is clocked by clocks of the second signal. Therefore, the signal output by the FIFO device is synchronized with respect to the second signal. If the frequencies of the first signal and the second signal differ, then multiple FIFO devices are used to successively store the data of the first signal. In this regard, the signal output by the plurality FIFO devices has the same frequency as the second signal and has a bit length larger than the first signal.

23 Claims, 3 Drawing Sheets

SYSTEM AND METHOD FOR SYNCHRONIZING A SIGNAL WITH RESPECT TO ANOTHER SIGNAL

FIELD OF THE INVENTION

The present invention generally relates to data communication and, in particular, to a system and method for synchronizing a first signal with respect to a second signal. The invention is particularly suited for synchronizing signals within a computer system having frequencies that are integer multiples of the system clock signal.

BACKGROUND OF THE INVENTION

As known in the art, most computer systems employ a system clock which is a crystal oscillator that provides a clock signal to control the timing of various functionality within the computer system. For example, many computer systems latch data on a rising edge of the system clock signal. However, not all timing relationships are determined by the system clock signal. A computer system might latch data into and out of the address and status bus, for example, on every rising edge of the clock signal while latching data into and out of the data bus with strobes occurring at a different frequency than the transitions of the system clock signal.

Unlike the system clock signal which continuously oscillates during the operation of the computer system, the strobe signals can be controlled. Therefore, as known in the art, a strobe signal may latch data during one time interval and produce no strobes during another time interval. However, during the time intervals when the strobe signal is generated and, thereby, latching data, the strobes typically latch data at a rate corresponding to a fraction of the system clock signal. Therefore, a predetermined number of strobes occurs for every cycle of the system clock signal during intervals when the strobe signal is active. Furthermore, it should be noted that the occurrence of intervals of active strobes usually bears no relation to the system clock signal.

As known in the art, there usually exists a delay in the occurrence of a rising edge of the system clock signal and in the occurrence of a corresponding strobe signal. Therefore, a difference exists in the phase relationship of a strobe and of an occurrence of an edge of the system clock signal. Accordingly, the data signal output from the data bus in response to strobe signals is not synchronized with respect to the system clock signal.

Further, if there are multiple transmitters of the strobe signal taking turns generating the strobes, then the phase relationship between the clock and strobes may change depending on which device is transmitting the strobe. In addition, the data signals which are latched with the strobes are typically generated by the same device that is generating the strobes. Therefore, the timing of the data signal latched by the strobes corresponds with the strobes, but the timing of the data signal typically changes with respect to the system clock.

However, it is often desirable for the data signals to be synchronized with the system clock signal for further processing within the computer system. Accordingly, in most applications, the data signals should be synchronized with respect to the system clock signal once the data signals have been latched off of the data bus. Since the delays between the data bus strobes and transitions of the system clock signal vary depending on which chip is generating the data and the strobes, any solution for resynchronizing data signals and system clock signals based on a specific time delay or phase delay is not always successful.

Thus, a heretofore unaddressed need exists in the industry for providing a system and method of reliably resynchronizing one signal with respect to another signal.

SUMMARY OF THE INVENTION

The present invention overcomes the inadequacies and deficiencies of the prior art as discussed herein. The present invention provides a synchronization system and method for synchronizing a first signal with respect to a second signal.

The present invention utilizes strobe signals, a data signal, a clock signal, and a first-in, first-out device. The FIFO device stores a data value of the data signal in response to strobes synchronized with the data signal. The FIFO device further outputs the values stored in the FIFO device in response to clocks of the clock signal. Therefore, the output of the FIFO device corresponds with the data signal and is synchronized with respect to the clock signal.

In accordance with another feature of the present invention, a latch is configured to latch the data values of the data signal in response to the strobe signals. A delay mechanism is configured to delay each strobe once the strobe has been received by the latch. After passing through the delay mechanism, the delayed strobe is received by the FIFO device which stores the value of the latch in response to the strobe. The delay associated with the delay mechanism allows at least the data values received by the latch to stabilize before the data values are stored by the FIFO device.

In accordance with another feature of the present invention, the FIFO device includes a plurality of latches, a first shift register, a second shift register and a multiplexer. Each of the plurality of latches are configured to store the data value received by the FIFO device when the latch detects a clock signal and an enabling signal. The first shift register is configured to successively transmit the enabling signal to each latch of the plurality of latches. A multiplexer is coupled to each of the plurality of latches and is configured to output a value stored in one of the latches of the plurality of latches based on a control signal provided by the second shift register.

The present invention can also be viewed as providing a synchronization method. Briefly described, the synchronization method can be broadly conceptualized by the following steps: generating a first signal and a second signal and synchronizing the first signal with respect to the second signal by storing a data value of the first signal in a FIFO device in response to a strobe signal and by clocking the data value out of the FIFO device in response to the second signal.

The present invention has many advantages, a few of which are delineated hereafter, as mere examples.

An advantage of the present invention is that one signal can be synchronized with respect to another signal. Therefore, a data signal within a computer system, for example, can be synchronized with the system clock of the computer system regardless of phase shifting.

Another advantage of the present invention is that a frequency of a data signal can be changed to a different frequency without experiencing any loss in data.

Other features and advantages of the present invention will become apparent to one skilled in the art upon examination of the following drawings in the detailed description. It is intended that all Such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DESCRIPTION OF THE INVENTION

Figure 1:
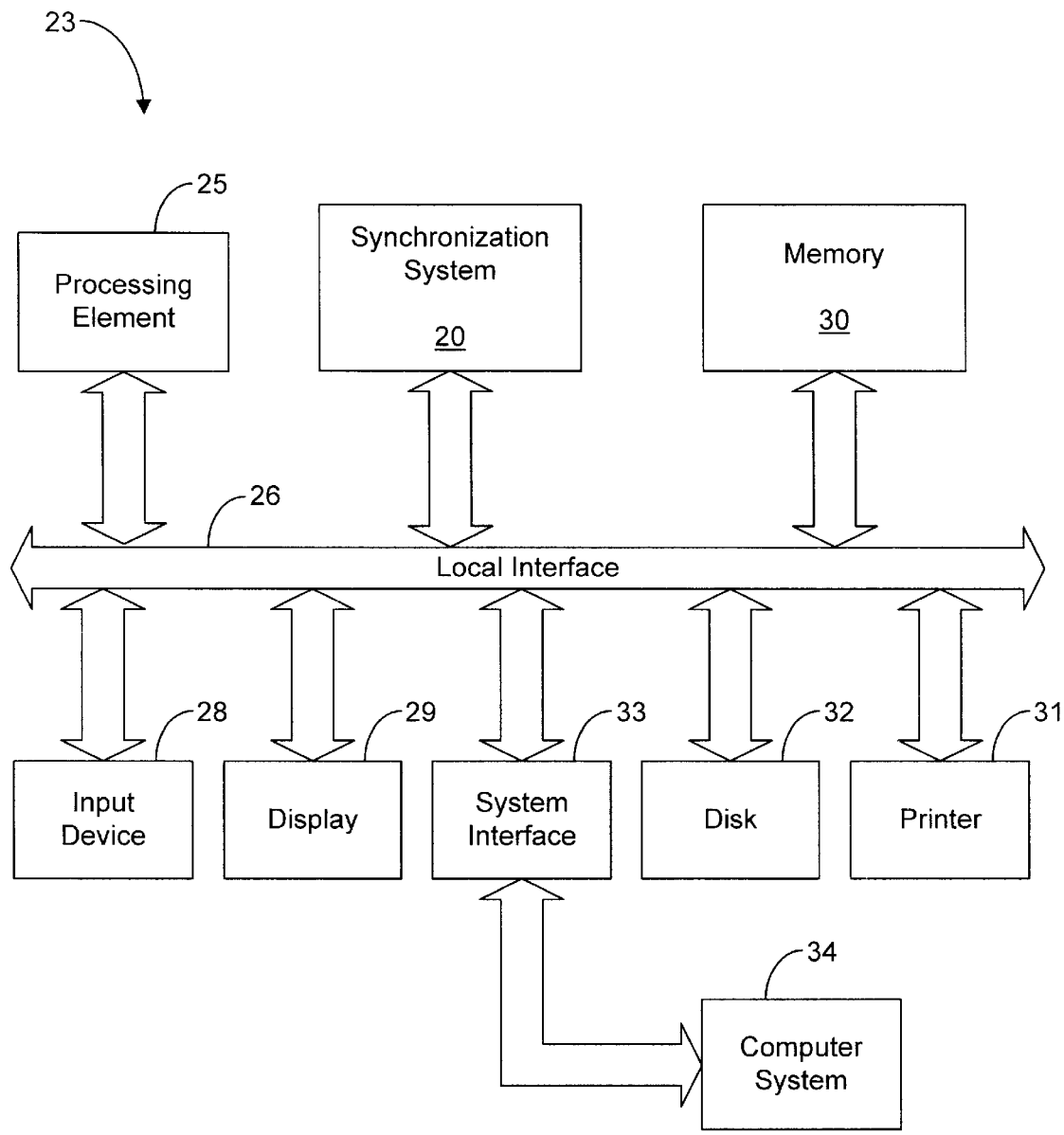
FIG. 1 is a block diagram illustrating a computer system employing a synchronization system in accordance with the principles of the present invention.

The present invention is a synchronization system that synchronizes one signal with respect to another signal. The synchronization system is particularly useful when the two signals have different frequencies. The synchronization system 20 of the present invention along with its associated methodology is preferably implemented within a computer system 23 as depicted in FIG. 1.

The preferred embodiment of the computer system 23 comprises one or more conventional processing elements 25, such as a digital signal processor (DSP), that communicate to and drive the other elements within the system 23 via a local interface 26, which can include one or more buses. Local interface 26 may include, for example, an address bus, a status bus, and a data bus as known in the art. Furthermore, an input device 28, for example, a keyboard or a mouse, can be used to input data from a user of the system 23, and screen display 29 or a printer 31 can be used to output data to the user. Data may be stored in memory 30, and a disk storage mechanism 32 can be connected to the local interface 26 to transfer data to and from a nonvolatile disk (e.g. magnetic, optical, etc.). The system 23 can be connected to a system interface 33 that exchanges data with another computer system 34. For example, the system 23 can receive, via system interface 33, signals from the other computer system 34 that are to be synchronized by synchronization system 20 when system interface 33 is coupled to the other computer system 34.

Figure 2:
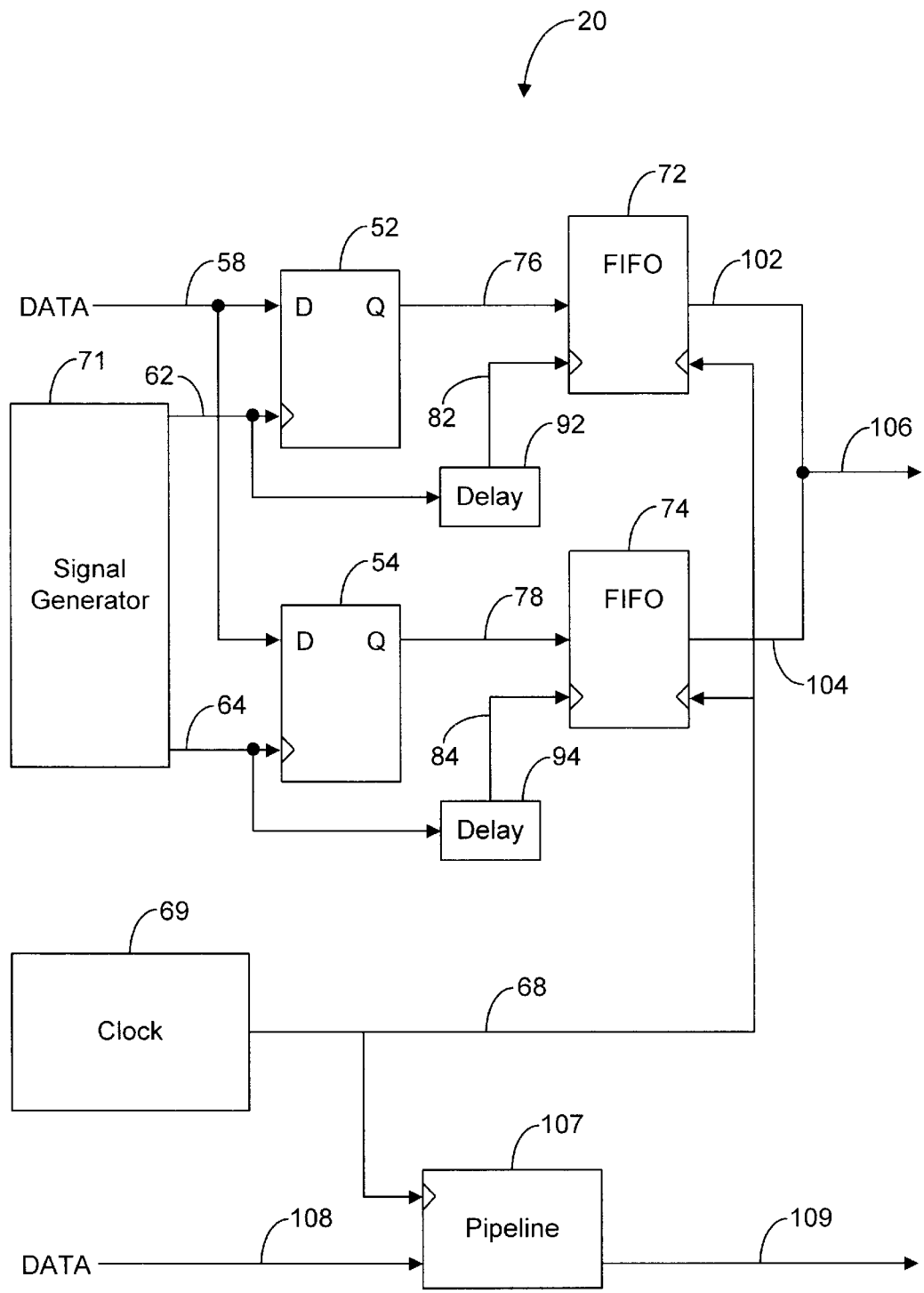
FIG. 2 is a block diagram illustrating the synchronization system of FIG. 1.

FIG. 2 depicts the synchronization system 20 of the present invention. The synchronization system 20 of the preferred embodiment includes latches 52 and 54. In the preferred embodiment, latches 52 and 54 are flip flops of any suitable conventional design or type. Latches 52 and 54 are designed to receive and store the data value (D) of data signal 58 on the occurrence of a strobe of strobe signals 62 and 64, respectively. As known in the art, a strobe corresponds to a particular transition of a strobe signal. Data signal 58 may be, for example, a signal residing on a data bus within the local interface 26 (FIG. 1).

Although not necessary in all applications, the number of latches 52 and 54 and of FIFO devices 72 and 74, which will be described in further detail hereinafter, should correspond to the frequency of data signal 58 divided by the frequency of system clock signal 68 in order to prevent data overflow. For example, in the preferred embodiment, the frequency of data signal 58 is twice the frequency of system clock signal 68. Therefore, the preferred embodiment utilizes two strobe signals 62 and 64, two latches 52 and 54, and two FIFO devices 72 and 74, as depicted in FIG. 2.

Clock signal 68 is generated by a clock 69, and strobe signals 62 and 64 are generated by a signal generator 71. Clock 69 and signal generator 71 can be of any suitable conventional design in order to generate clock signal 68 and strobe signals 62 and 64, respectively. When synchronization system 20 is configured to synchronize signals from another computer system 34 (FIG. 1), clock 69 and signal generator 71 reside within the other computer system 34, and computer system 23 (FIG. 1) receives the data signals 58 and 108, the strobe signals 62 and 64, and the system clock signal 68 via system interface 33 (FIG. 1). In the preferred embodiment, clock 69 is a crystal oscillator known in the art, and signal generator 71 includes a crystal oscillator similar to system clock 69, whereby the signal generator 71 generates strobes 62 and 64 at a frequency that is an integer multiple of the clock signal 68. The signal generator 71 is configured to generate the strobe signals 62 and 64 during intervals when data is to be latched by latches 52 and 54.

In response to strobes 62 and 64, respectively, latches 52 and 54 are designed to output the current value (Q) currently stored in latches 52 and 54. A first-in, first-out (FIFO) device 72 is configured to receive the value output by latch 52 as signal 76, and another FIFO device 74 is configured to receive the value output by latch 54 as signal 78. As will be discussed in further detail hereinbelow, FIFO device 72 is designed to store the value of signal 76 upon the occurrence of a strobe received from delayed strobe signal 82, and FIFO device 74 is designed to store the value of signal 78 upon the detection of a strobe received from delayed strobe signal 84.

Delay mechanism 92 is designed to receive strobe signal 62. Delay mechanism 92 is configured to delay strobe signal 62 and to output strobe signal 62 in delayed form as delayed strobe signal 82. Although the amount of delay associated with delay mechanism 92 may depend on other factors, the amount of delay should at least correspond to a sufficient amount of time for the data value of latch 52 to stabilize after a change in state of the data value occurs. As known in the art, when a data value switches state, there is a finite amount of transition time that occurs where the value of the data value is unstable and may indicate an incorrect value. Therefore, delay mechanism 92 is designed to ensure that the data value latched into FIFO device 72 is reliable by not allowing FIFO device 72 to latch the value of latch 52 while the value of latch 52 may be in a transition state.

Similar to delay mechanism 92, delay mechanism 94 is configured to receive strobe signal 64 and to output strobe signal 64 in delayed form as delayed strobe signal 84. Similar to delay mechanism 92, the amount of delay associated with delay mechanism 94 should at least correspond to a sufficient amount of time for the data value of latch 54 to stabilize after a change in state of the value stored in latch 54 occurs. Therefore, delay mechanism 94 is designed to ensure that the data value latched into FIFO device 74 is reliable by not allowing FIFO device 74 to latch the value of latch 54 while the value of latch 54 may be in a transition state.

Delay mechanisms 92 and 94 can be of any conventional design to achieve the functionality of delaying strobe signals 62 and 64. For example, each delay mechanism 92 and 94 may be configured as a series of buffers. As signal 62 or 64 passes through the series of buffers, the signal 62 or 64 experiences a delay that corresponds to the number of buffers in the series. The more buffers that are passed through, the longer the signal 62 or 64 is delayed. Accordingly, the number of buffers in delay mechanisms 92 and 94 can be varied until strobe signals 62 and 64 experience a suitable delay to at least ensure that the data received by FIFO devices 72 and 74 is reliable.

FIFO devices 72 and 74 of FIG. 2 are further configured to receive system clock signal 68 and to output a stored data value onto connections 102 and 104, respectively. in response to a clock from system clock signal 68. As known in the art, a clock corresponds to a particular transition of a clock signal. FIFO device 72 is designed to store each value received from signal 76 and to consecutively output each of these values in the order received onto connection 102. Furthermore, FIFO device 74 is designed to store each value received from signal 78 and to consecutively output each of these values in the order received onto connection 104. The signals on connections 102 and 104 can be combined on a single connection 106 as single larger signal.

As known in the art, system clock signal 68 is typically used to clock other data signals received by computer system 23 (FIG. 1). Accordingly, a pipeline 107 is configured to receive a sample of a data signal 108 and to output a sample of the signal 108 on connection 109 in response to a transition of clock signal 68. As a result, the signal on connection 109 is synchronized with respect to clock signal 68, and, hence, the signal on connection 106. In this way, the synchronization system 20 can synchronize two data signals 58 and 108 received by the system even when the two signals have different frequencies.

Figure 3:
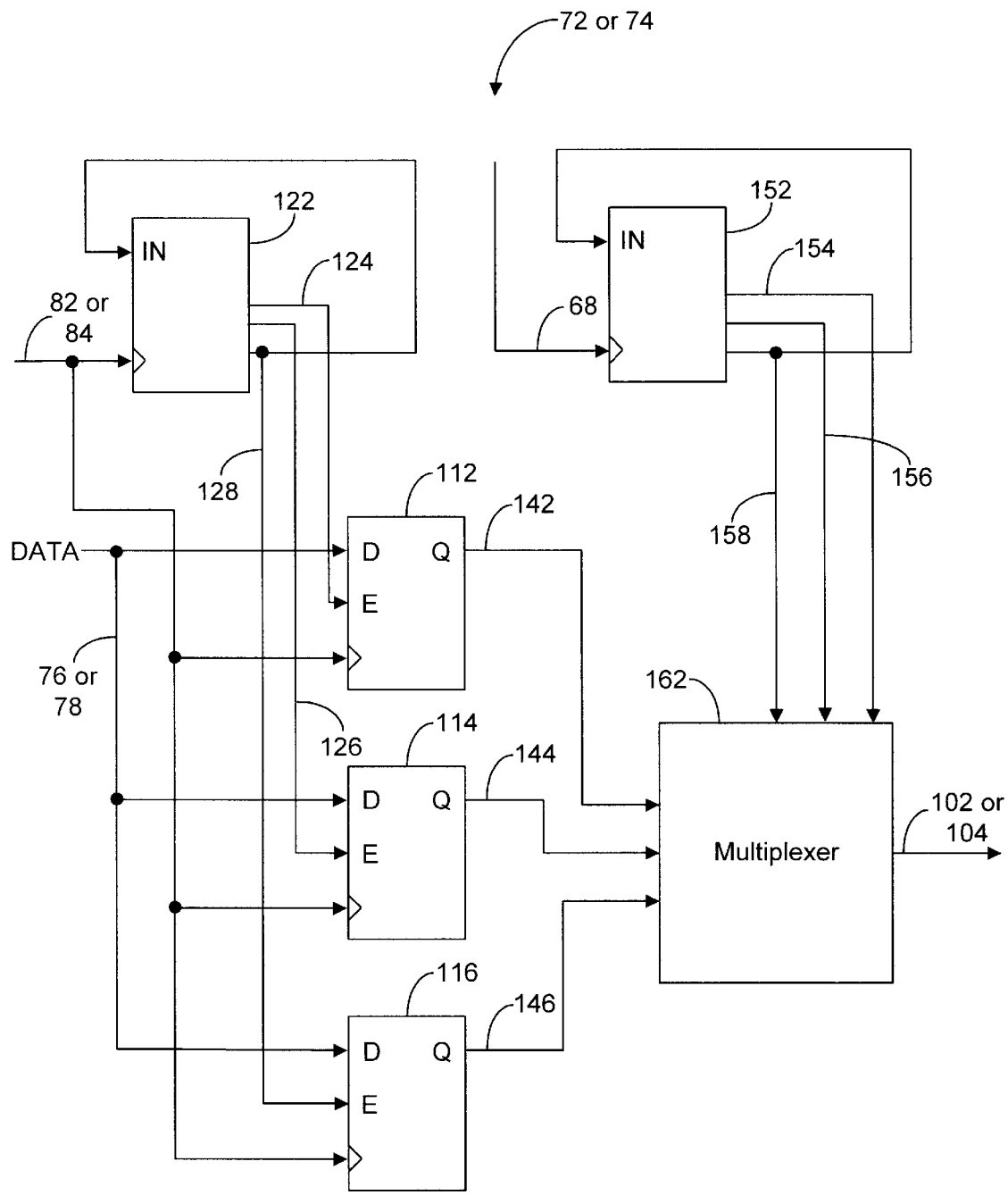
FIG. 3 is a block diagram illustrating the FIFO devices of FIG. 2.

FIG. 3 depicts an implementation of FIFO devices 72 and 74 which is suitable for implementing the principles of the present invention. The implementation of FIG. 3 shows a FIFO device 72 and 74 capable of storing 3 states, although other number of states are possible. FIFO devices 72 and 74 include latches 112, 114 and 116. Latches 112, 114 and 116 are designed to receive data signal 76 or 78 as a data (D) input. Shift register 122 is designed to provide enable (E) signals 124, 126 and 128 to latches 112, 114 and 116, respectively. A particular logical value, such as a binary one, for signals 124, 126 and 128 enables each respective latch 112, 114 and 116 to latch in a new value from data signal 76 or 78. Latch 112 is designed to output the current value of latch 112 as signal 142 and to store the current value of data signal 76 or 78 when latch 112 receives a delayed strobe 82 or 84 while enable signal 124 is high. Furthermore, latch 114 is designed to output the current value of latch 114 as signal 144 and to store the current value of data signal 76 or 78 when latch 114 receives a delayed strobe 82 or 84 while enable signal 126 is high. Additionally, latch 116 is designed to output the current value of latch 116 as signal 146 and to store the current value of data signal 76 or 78 when latch 116 receives a delayed strobe 82 or 84 while enable signal 128 is high.

Shift register 122 is designed to enable only one latch 112, 114 or 116 at a time and is designed to consecutively alternate which latch 112, 114 or 116 is enabled in response to a delayed strobe 82 or 84. In this regard, shift register 122 is configured to initially output an enabling logical value (i.e., a binary one) as signal 124 and to initially output a disabling logical value (i.e. a binary zero) as signals 126 and 128. Thereafter, shift register 122 is configured to shift the logical value of signal 124 to signal 126, to shift the logical value of signal 126 to signal 128, and to shift the logical value of signal 128 to signal 124 upon the detection of a delayed strobe 82 or 84.

Shift register 152 is designed to provide control signals 154, 156 and 158 to multiplexer 162. In this regard, shift register 152 operates like shift register 122 except that shift register 152 is designed to change its output in response to a clock from clock signal 68 rather than from delayed strobe 82 or 84. Therefore, shift register 152 is preferably designed to output a high logical value and two low logical values as signals 154, 156 and 158. Shift register 152 is further configured to consecutively alternate which signal 154, 156 or 158 is a logical high value upon the detection of a clock from system clock signal 68.

Multiplexer 162 is of any suitable conventional design and is configured to output the data value of signal 142, 144 or 146 onto connection 102 or 104. The signal currently output by multiplexer 162 depends on which signal 154, 156 or 158 is currently a logical high value. For example, when signal 154 corresponds to a logical high value, multiplexer 162 is designed to output the data value of signal 142 onto connection 102 or 104. However, when signal 156 corresponds to a logical high value multiplexer 162 is designed to output the data value of signal 144 onto connection 102 or 104, and when signal 158 corresponds to a logical high value, multiplexer 162 is designed to output the value of signal 146 onto connection 102 or 104.

It should be apparent to one ordinarily skilled in the art upon reading this disclosure that both FIFO devices 72 and 74 are designed to store each value received from signals 76 and 78, respectively, and to consecutively output each of these values in the order received onto connections 102 and 104 in response to a clock from clock signal 68.

OPERATION

The preferred use and operation of the synchronization system 20 and associated methodology are described hereafter.

In response to strobe signal 62, latch 52 stores the current data value (D) of data signal 58 and outputs as signal 76 the current data value (Q) stored in latch 52. After the strobe signal 62 is delayed at least a sufficient amount of time by delay mechanism 92 to ensure that the data value (Q) stored in latch 52 has stabilized, the strobe signal 62 passes out of delay mechanism 92 as delayed strobe signal 82 into FIFO device 72. The delayed strobe signal 82 causes FIFO device 72 to store the data value of signal 76. Therefore, in response to every strobe 62, the current data value of data signal 58 is stored into FIFO device 72.

Similarly in response to strobe signal 64, latch 54 stores the current value of data signal 58 and outputs as signal 78 the current value stored in latch 54. The value of signal 78 is stored in FIFO device 74 after the strobe signal 64 passes through delay mechanism 94 and into FIFO device 74 as delayed strobe signal 84. Delay mechanism 94 delays the strobe signal 84 at least a sufficient amount of time to ensure that signal 78 has stabilized before being stored in FIFO device 74. Therefore, in response to every strobe 64, the current value of data signal 58 is stored into FIFO device 74.

In the preferred embodiment where two latches 52 and 54 and two FIFO devices 72 and 74 are utilized, signal generator 71 consecutively outputs one clock for each strobe signal 62 and 64 during each period of clock signal 68. Therefore, the strobe signals 62 and 64 together define an oscillating signal having a frequency twice that of the clock signal during active intervals of outputting strobes.

FIFO devices 72 and 74 respond to clocks from system clock signal 68 in order to output data values stored in FIFO devices 72 and 74 onto connections 102 and 104, respectively. In this regard, FIFO devices 72 and 74 consecutively output the values stored in FIFO devices 72 and 74 in the same order that the values were received by FIFO devices 72 and 74. Therefore, the first value stored in FIFO devices 72 and 74 is the value output by FIFO devices 72 and 74 in response to the first clock of system clock signal 68. Additionally, the second value stored in FIFO devices 72 and 74 is the value output by FIFO devices 72 and 74 in response to the second clock of system clock signal 68.

Since data is output by FIFO devices 72 and 74 in response to clocks of system clock signal 68, the data signals transmitted across connections 102, 104 and, hence, 106 are synchronized with respect to system clock signal 68. Therefore, synchronization system 20 achieves the functionality of converting an unsynchronized data signal 58 having twice the frequency of system clock signal 68 into signals on connection 106 that are synchronized with respect to system clock signal 68 and that have the same frequency as system clock signal 68.

Furthermore, since the signals on connections 102 and 104 correspond to values of data signal 58, the bit length of the signals on connections 102 and 104 corresponds to the bit length of data signal 58. However, the bit length of the signals on connection 106 corresponds to twice the bit length of data signal 58. For example, if the data signal 58 is 64 bits long, then the signals on connections 102 and 104 (which correspond to samples of signal 58) are 64 bits long as well. However, the signals on connection 106 are 128 bits long. Having twice the bit length of data signals 58 enables the signals on connection 106 to transmit, at the frequency of system clock signal 68, the same information contained in data signals 58 which have twice the frequency of system clock signal 68 in the preferred embodiment.

Referring to FIG. 3, the delayed strobe signals 82 and 84 are received by the shift register 122 and latches 112, 114 and 116 of FIFO devices 72 and 74, respectively. Assuming that a logical high value is enabling shift register 122 initially outputs a logical high value as signal 124 and a logical low value as signals 126 and 128. Every strobe 82 or 84 causes shift register 122 to shift the data value of signal 124 to signal 126, to shift the data value of signal 126 to signal 128 and to shift the data value of signal 128 to signal 124. Therefore, the latches 112, 114 and 116 consecutively receive a logical high enabling signal 124, 126 or 128.

Each latch 112, 114 or 116 stores the value of signal 76 or 78 when a delayed strobe 82 or 84 is detected while the respective latch 112, 114 or 116 is enabled, Since each latch 112, 114 or 116 is consecutively enabled, the values of latches 112, 114 and 116 are consecutively updated. For example, assume latch 112 updates the value stored in latch 112 upon a detection of a delayed strobe 82 or 84. On the next delayed strobe 82 or 84, latch 114 is enabled and updates the value stored in latch 114. Likewise, latch 116 updates the value stored in latch 116 upon the next detection of a delayed strobe 82 or 84. The process repeats as the next delayed strobe signal 82 or 84 causes latch 112 to update its stored value.

Each latch 112, 114 and 116 continuously outputs the value stored in the latch 112, 114 and 116 as signals 142, 144, and 146, respectively. Multiplexer 162 outputs the value of one of signals 142, 144 or 146 depending on the state of signals 154, 156 and 158. Shift register operates the same as shift register 122 except the values of signals 154, 156 and 158 are shifted on the detection of a clock in system clock signal 68 as opposed to a delayed strobe 82 or 84. Therefore, signals 154, 156 and 158 consecutively indicate a logical high value that shifts from one signal 154, 156 or 158 to another signal 154, 156 or 158. When the value of signal 154 is a logical high, multiplexer 162 outputs the value of signal 142 on connection 102 or 104. When the value of signal 156 is a logical high, multiplexer 162 outputs the value of signal 144 on connection 102 or 104, and when the value of signal 158 is a logical high, multiplexer 162 outputs the value of signal 146 on connection 102 or 104.

Although the preferred embodiment depicts three latches 112, 114 and 116 it is possible to utilize various other number of latches 112, 114 and 116. The number of latches 112, 114 and 116 should be large enough so that each data value latched into latches 112, 114 and 116 has time to settle before being accessed by multiplexer 162. For example, assume that signal 76 or 78 is first latched into latch 112. Sometime later the current value of signal 76 or 78 is then latched into latch 114, and then, at an even later time, the current value of signal 76 or 78 is latched into latch 116. Therefore, on the next detection of a delayed strobe 82 or 84, the current data value of signal 76 or 78 is latched into latch 112, replacing the previous value stored in latch 112. Accordingly, prior to the next detection of a delayed strobe 82 or 84, the value of latch 112 should be unloaded in response to a clock of system clock signal 68. If the value of latch 112 is not unloaded before being replaced, data overflow will occur. Therefore, the number of latches 112, 114 and 116 should be large enough to ensure that any value of a latch 112, 114 or 116 is not updated prior to being accessed by multiplexer 162.

Since the data signals on connections 102 and 104 are clocked out of FIFOs 72 and 74, respectively, by clock signal 68, the data signals on connection 102 and 104 are synchronized with respect to clock signal 68. As a result, for each clock detected from clock signal 68, two previously stored samples of data signal 58 are output on connections 102 and 104 such that the signal on connection 106 forms a signal having a bit length twice as long as each sample of data signal 58. Accordingly, the samples of data signal 58 are synchronized with the clock signal 68 by the synchronization system 20 of the present invention.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. A synchronization system for synchronizing a data signal with respect to a clock signal, comprising:

a first FIFO device configured to store a first data value of said data signal during a first time period and to output said first data value stored in said first FIFO device in response to a transition of said clock signal; and a second FIFO device configured to store a second data value of said data signal during a second time period and to output said second data value stored in said second FIFO device in response to said transition of said clock signal, wherein said first time period is outside of said second time period, and wherein said first FIFO device and said second FIFO device simultaneously output said first data value and said second data value, respectively.

2. The synchronization system of claim 1, wherein a frequency of said data signal is different than a frequency of said clock signal.

3. The synchronization system of claim 1, wherein said clock signal is a system clock signal associated with a computer system.

4. The system of claim 3, wherein said data signal is latched from a bus within said computer system in response to transitions of a strobe signal.

5. The synchronization system of claim 1, further comprising:

a first latch having an output port coupled to an input port of said first FIFO device, said first latch configured to latch said first data value in response to a first strobe signal transition; and a second latch having an output port coupled to an input port of said second FIFO device, said second latch configured to latch said second data value in response to a second strobe signal transition.

6. The synchronization system of claim 5, further comprising:

a first delay mechanism configured to receive said first strobe signal transition and to produce a first delayed strobe signal transition based on said first strobe signal transition received by said first delay mechanism, said first delay mechanism further configured to transmit said first delayed strobe signal transition to said first FIFO device after said first latch has latched said first data value; and a second delay mechanism configured to receive said second strobe signal transition and to produce a second delayed strobe signal transition based on said second strobe signal transition received by said second delay mechanism, said second delay mechanism further configured to transmit said second delayed strobe signal transition to said second FIFO device after said second latch has latched said first second value, wherein said first FIFO device is configured to store said first data value in response to said first delayed strobe signal transition and said second FIFO device is configured to store said second data value in response to said second delayed strobe signal transition.

7. A synchronization system for synchronizing a data signal with respect to a clock signal, comprising:

a first-in, first-out (FIFO) device configured to store data values of said data signal in response to transitions of a strobe signal and to output said data values stored in said FIFO device in response to transitions of said clock signal, said strobe signal synchronized with respect to said data signal; and a second FIFO device configured to store data values of said data signal in response to transitions of another strobe signal and to output said data values stored in said second FIFO device in response to said transitions of said clock signal, wherein said data values output from said first and second FIFO devices for each of said transitions of said clock signal form an output signal corresponding to said data signal, and wherein said output signal has a bit length that is larger than a bit length of said data signal.

8. A synchronization system for synchronizing a data signal with respect to a clock signal, comprising:

a first-in, first-out (FIFO) device configured to store data values of said data signal in response to transitions of a strobe signal and to output said data values stored in said FIFO device in response to transitions of said clock signal, said strobe signal synchronized with respect to said data signal;

a latch configured to store one of said data values of said data signal in response to one of said transitions of said strobe signal and to output said one of said data values stored in said latch, wherein said FIFO device is further configured to receive said one data value from said latch; and a delay mechanism configured to delay said strobe signal a sufficient amount of time for said one data value stored in said latch to stabilize, wherein said FIFO device receives said delayed strobe signal from said delay mechanism, wherein said FIFO device further comprises:

a plurality of latches, each of said plurality of latches configured to store said one of said data values when said each of said plurality of latches detects said one of said transitions of said delayed strobe signal and an enabling value from an enabling signal;

a first shift register configured to transmit said enabling value to each of said plurality of latches;

a multiplexer coupled to said each of said plurality of latches and configured to output a value stored in one of said plurality of latches based on a control signal; and a second shift register configured to transmit said control signal.

9. A synchronization system for synchronizing a first signal having a first frequency with respect to a second signal having a second frequency different than said first frequency, comprising a plurality of first-in, first-out (FIFO) devices, each of said plurality of FIFO devices configured to store a plurality of data values of said first signal at different times in response to different strobe signal transitions and configured to simultaneously output each of said data values in response to a transition of said second signal.

10. The synchronization system of claim 9, wherein said second signal is a system clock signal associated with a computer system.

11. A synchronization system for synchronizing a first signal having a first frequency with respect to a second signal having a second frequency different than said first frequency, comprising:

a plurality of first-in, first-out (FIFO) devices, each of said plurality of FIFO devices configured to store a data value of said first signal in response to a transition of a strobe signal synchronized with said first signal and configured to receive a transition of said second signal for outputting one of said data values in said each of said plurality of FIFO devices; and a plurality of latches, each latch of said plurality of latches configured to store one of said data values of said first signal in response to one of said transitions of said strobe signal and to output said one of said data values stored in said each latch.

12. The synchronization system of claim 11, further comprising:

a plurality of delay mechanisms, each delay mechanism of said plurality of delay mechanisms configured to delay one of said strobe signals a sufficient amount of time for said one of said data signals stored in one of said latches corresponding with said each delay mechanism to stabilize, wherein one of said plurality of FIFO devices corresponding with said one of said latches receives said strobe signal from said delay mechanism.

13. The synchronization system of claim 11, wherein said each of said plurality of FIFO devices further comprises:

a second plurality of latches, each of said second plurality of latches configured to store said data value when said each of said second plurality of latches detects said transitions of said strobe signal and an enabling value from an enabling signal;

a first shift register configured to successively transmit said enabling value to each of said second plurality of latches;

a multiplexer coupled to said each of said second plurality of latches and configured to output a value stored in one of said second plurality of latches based on a control signal; and a second shift register configured to transmit said control signal.

14. A synchronization system for synchronizing a first signal having a first frequency with respect to a second signal having a second frequency different than said first frequency, comprising a plurality of first-in, first-out (FIFO) devices, each of said plurality of FIFO devices configured to store a data value of said first signal in response to a transition of a strobe signal synchronized with said first signal and configured to receive a transition of said second signal for outputting one of said data values in said each of said plurality of FIFO devices, wherein a value of said first frequency is a first integer multiple value of a value of said second frequency and wherein a number of said plurality of FIFO devices is a value corresponding to said first integer multiple value.

15. The synchronization system of claim 14, wherein said system is configured to output a signal having a number of bits that is a second integer multiple value of a number of bits of said first signal, wherein said second integer multiple value corresponds to said first integer multiple value.

16. A synchronization method, comprising the steps of:
receiving a first signal and a second signal;
latching a value of a data signal in response to a transition associated with said first signal; and
synchronizing said data signal with respect to said second signal,
wherein said synchronizing step further comprises the steps of:
  (a) storing said value of said data signal in a first-in, first-out (FIFO) device in response to a transition of said first signal; and
  (b) clocking said data value out of said FIFO device in response to a transition of said second signal,
wherein said second signal is a system clock signal associated with a computer system, wherein a value of a frequency of said data signal is an integer multiple value of a value of a frequency of said second signal.

17. The synchronization method of claim 16, further comprising a step of delaying said transition associated with said first signal prior to said storing step and subsequent to said latching step.

18. A synchronization method for synchronizing a first signal with respect to a second signal, comprising the steps of:
consecutively storing each of a plurality of data values of said first signal into a plurality of first-in, first-out (FIFO) devices in response to strobe signal transitions; and
simultaneously clocking said each of said plurality of data values out of said plurality of FIFO devices in response to a transition of said second signal.

19. The synchronization method of claim 18, wherein a number of said plurality of FIFO devices corresponds to a value of a frequency of said first signal divided by a value of a frequency of said second signal.

20. The synchronization method of claim 18, further comprising a step of latching one of said plurality of data values in response to one of said strobe signal transitions.

21. The synchronization method of claim 20, further comprising a step of delaying said one of said strobe signal transitions prior to said storing step and subsequent to said latching step.

22. A synchronization method for synchronizing a data signal with respect to a clock signal, comprising the steps of:
storing a first data value of said data signal in a first FIFO device during a first time period;
storing a second data value of said data signal in a second FIFO device during a second time period; and
simultaneously outputting said first data value from said first FIFO device and said second data value from said second FIFO device in response to a transition of said clock signal,
wherein said first time period is outside of said second time period.

23. The synchronization method of claim 22, further comprising the steps of:
latching said first data value in response to a first transition of a strobe signal;
delaying said first transition to generate a second transition;
performing said storing a first data value step in response to said second transition;
latching said second data value in response to a third transition of a strobe signal;
delaying said third transition to generate a fourth transition; and
performing said storing a second data value step in response to said fourth transition.

* * * * *